US008715818B2

(12) United States Patent
Park et al.

(10) Patent No.: US 8,715,818 B2
(45) Date of Patent: May 6, 2014

(54) WOOD PLASTIC COMPOSITE PANEL WITH CONTRACTILITY

(75) Inventors: Jong Sung Park, Daejeon (KR); Jung Il Son, Gyeonggi-do (KR); Kyung Gu Nam, Daejeon (KR)

(73) Assignee: LG Hausys, Ltd., Seoul (KR)

( * ) Notice: Subject to any disclaimer, the term of this patent is extended or adjusted under 35 U.S.C. 154(b) by 105 days.

(21) Appl. No.: 13/394,775

(22) PCT Filed: Sep. 16, 2010

(86) PCT No.: PCT/KR2010/006351
§ 371 (c)(1), (2), (4) Date: Mar. 7, 2012

(87) PCT Pub. No.: WO2011/037364
PCT Pub. Date: Mar. 31, 2011

(65) Prior Publication Data

US 2012/0171446 A1 Jul. 5, 2012

(30) Foreign Application Priority Data

Sep. 24, 2009 (KR) ........................ 10-2009-0090388

(51) Int. Cl.

| | |
|---|---|
| ***B27N 3/02*** | (2006.01) |
| ***B32B 5/18*** | (2006.01) |
| ***B32B 21/02*** | (2006.01) |
| ***B29C 47/14*** | (2006.01) |

(52) U.S. Cl.
USPC ......................... 428/220; 428/219; 264/177.2

(58) Field of Classification Search
USPC ................................ 428/219, 220; 264/177.2
See application file for complete search history.

(56) References Cited

U.S. PATENT DOCUMENTS

| | | | | |
|---|---|---|---|---|
| 6,341,461 | B1 * | 1/2002 | Crowley et al. | 52/311.2 |
| 6,449,913 | B1 * | 9/2002 | Shelton | 52/390 |
| 7,943,070 | B1 * | 5/2011 | Clark et al. | 264/120 |
| 2005/0045015 | A1 * | 3/2005 | Brayton et al. | 83/828 |
| 2007/0251173 | A1 * | 11/2007 | Stokes | 52/403.1 |

FOREIGN PATENT DOCUMENTS

| | | | |
|---|---|---|---|
| CN | 1482165 | A | 3/2004 |
| CN | 1482166 | A | 3/2004 |
| JP | 2007-008107 | A | 1/2007 |
| JP | 2008-036910 | A | 2/2008 |
| KR | 10-2004-0029073 | A | 4/2004 |
| KR | 10-2007-0118265 | A | 12/2007 |
| KR | 10-2008-0085289 | A | 9/2008 |
| KR | 10-2008-0085289 | A | 9/2008 |
| KR | 10-2008-0090611 | A | 10/2008 |
| KR | 1020080090611 | A1 * | 10/2008 |

OTHER PUBLICATIONS

Machine_English_Translation_KR_1020080090611_A; Sin; Synthetic Woods and their Manufacturing Methods; Oct. 2008; KIPO; whole document.*

Klyosov, Anatole; Linear Shrinkage of Extruded Wood-Plastic Composites; Jan. 22, 2007; John Wiley & Sons; whole document.*

* cited by examiner

*Primary Examiner* — Aaron Austin
*Assistant Examiner* — Tahseen N Khan
(74) *Attorney, Agent, or Firm* — McKenna Long & Aldridge, LLP

(57) ABSTRACT

Disclosed is a tacker construction panel made of wood plastic composite (WPC), and more particularly, to a tacker construction panel, which includes 50 wt % or more of wooden flour, has a thickness of 2 to 10 mm and shows a contractility of 0.1 to 3% along a longitudinal direction after lapse of 24 hours at a temperature of 60° C. and a humidity of 90% RH.

9 Claims, 5 Drawing Sheets

WOOD PLASTIC COMPOSITE PANEL WITH CONTRACTILITY

This application is a National Stage Entry of International Application No. PCT/KR2010/006351, filed Sep. 16, 2010, and claims the benefit of Korean Application No. 10-2009-0090388, filed on Sep. 24, 2009, which is hereby incorporated by reference for all purposes as if fully set forth herein.

TECHNICAL FIELD

The present invention relates to a tacker construction panel made of wood plastic composite (WPC), and more particularly, to a tacker construction panel, which includes 50 wt % or more of wooden flour, has a thickness of 2 to 10 mm and shows a contractility of 0.1 to 3% along a longitudinal direction after lapse of 24 hours at a temperature of 60° C. and a humidity of 90% RH.

BACKGROUND ART

A WPC is a composite material which is formed by mixing natural material, such as wooden flour or wood fiber, with synthetic resin, and is an interior or exterior material capable of replacing wood material since it has excellent durability as compared with natural wood material and excellent natural texture and processability which cannot be obtained from the plastic.

Specifically, the WPC is manufactured into a panel shaped product by mixing wooden flour in a granular or pellet form with synthetic resin in a predetermined ratio and various additives according to the use and then extruding or injecting the mixture.

FIG. 1 is a schematic diagram showing a conventional extrusion method, and FIG. 2 is a partial diagram showing an extrusion die and a vacuum cooler (calibration unit) used in the extrusion method of FIG. 1.

Referring to the figures, the extrusion is performed by sequentially passing through an extruder 10, an extrusion die 20, a vacuum cooler 30, a pulling device 40 and a cutter 50 along an advancing direction of extruded product.

Specifically, the extrudate prepared by plasticizing extrusion material mixed by an agitator 11 and extruding it with being melted through the extruder 10 passes through the extrusion die 20, in which external heater 22 is mounted along a nozzle 21, to form a predetermined shape and then discharged at a high temperature from the extrusion die 20.

At this time, an extrusion product can be manufactured by passing the extrudate through the vacuum cooler 30, so as to cool and solidify the profile of the extrudate extruded at a high temperature from the die, and the pulling device 40, and then cutting the extrudate into a desired length.

The WPC thereby manufactured is mainly used as an exterior material for a deck, a fence and a siding, and for example, tacker construction is performed on the WPC when constructing a siding.

The tacker construction means the manner of directly drilling a panel (directly fastening using nails or anchors), or the manner of firstly constructing square lumbers or section steels on the wall surface and then secondly directly drilling the panel on the square lumbers or section steels using nails, etc. or indirectly fastening the panel on the square lumbers or section steels using clipping subsidiary material, etc.

However, WPC manufactured as described above may be subjected to warpage, twist, etc., in spite that it is a resin composite using synthetic resin and wooden flour, when the panel is expanded due to external causes such as climate, temperature and humidity, and there is limitation to restricting the warpage of the panel even if the panels are coupled by tacker construction.

Therefore, there have been high needs for the technology capable of constructing a structure that is stable for a long time without the expansion of the WPC panel used for an exterior material even when the WPC panel is constructed as the exterior material by the tacker construction.

DISCLOSURE OF INVENTION

It is an object of the present invention to provide wood plastic composite panel with contractility capable of solving the above problems. The wood plastic composite panel can be used as tacker construction panel The present inventors have completed this invention from the finding based on various studies of long time that when forming the tacker construction panel so that the tacker construction panel has a contractility under a specific condition, the panel can keep its shape, thereby capable of forming a structure stable for a long time at a desired level even when tacker constructed.

To achieve the object of the invention, the present invention provides a tacker construction panel, made of wood plastic composite, wherein the panel includes 50 wt % or more of wooden flour, has a thickness of 2 to 10 mm and shows a contractility of 0.1 to 3% along a longitudinal direction after lapse of 24 hours at a temperature of 60° C. and a humidity of 90% RH.

That is, since the tacker construction panel in accordance with the present invention is manufacture of a panel showing a contractility under a specific condition as described above, it is possible to effectively prevent warpage by compensation resulted from the contractility even under a condition where the panel is expanded by external environment, and form a structure which is stable at a desired level for a long time after the tacker construction.

The wooden flour may include short fibers made by cutting the wooden flour, which is made by pulverizing natural hardwood or recycled wood into a granular or pellet form, to a predetermined length, and the content of the wooden flour is preferably 50 to 85 wt % for the total weight.

If the content of the wooden flour is too low, the content of the synthetic resin becomes too high and thus it is difficult to provide an appearance or texture similar to the natural hardwood. On the contrary, if the content of the wooden flour is too high, a binding force between the wooden flours is decreased due to the reduction in the content of the synthetic resin and thus it is difficult to provide a desired strength and durability.

The thickness of the panel is determined in comprehensive consideration of a shape of the panel, tacker constructability and the contractility, and it is preferably 2 to 10 mm as defined above, more preferably 3 to 8 mm.

The panel in accordance with the present invention can be manufactured by various methods, and for example, the panel is manufactured by an extrusion process, and the contractility is given by stretch during the extrusion process.

That is, the synthetic resin that constructs the extrudate is partially crystallized by stretching the extrudate produced by the extrusion in a longitudinal direction, and it is possible to form the panel having the desired contractility by solidifying the stretched extrudate so as to have a suitable internal stress.

The contractility of the panel is 0.2 to 1% in a longitudinal direction of the panel as defined above. If the contractility is too small, it is difficult to show the effect according to the contraction. On the contrary, if the contractility if too large, it is difficult to keep the desired shape of the panel due to the excessive contraction.

Accordingly, if these problems are not caused, the contractility may be out of the aforementioned range.

More preferably, the contractility is 0.2 to 1%.

In a preferred embodiment, the contractility is greater than a dimensional variation of the panel.

Herein, the dimensional variation is the increment from the original dimension by expansion or the like.

Therefore, although the panel is expanded by external causes such as climate, temperature and humidity, it is possible to prevent the warpage of the panel and keep the panel in the desired shape since the dimensional variation is smaller than the contractility given to the panel during the extrusion process.

If necessary, the contractility may be set inverse proportional to the thickness of the panel within a range of the thickness of the panel.

That is, by making the contractility smaller as the thickness of the panel is thicker, it is possible to make the overall contraction constant under the same external environment as compared with a panel having a relative thin thickness and a large contractility.

The panel may be formed in a solid structure, and may have preferably a density of 1.0 g/cm$^3$ or less, more preferably 0.5 to 1.0 g/cm$^3$.

In one preferred embodiment, the panel is formed in a micro cellular foamed structure.

This micro cellular foamed structure is, as disclosed in Korean patent application No. 2005-115637, preferably such a structure that pores in the skin portion of the micro cellular foam is further miniaturized than the pores in the core portion and thus a density in the skin portion is dense and has a mechanical property similar to non-foamed sheet.

The disclosure of the aforementioned application is hereby incorporated by reference.

MODE FOR INVENTION

The advantages, features and aspects of the invention will become apparent from the following description of the embodiments with reference to the accompanying drawings, which is set forth hereinafter.

Figure 3:
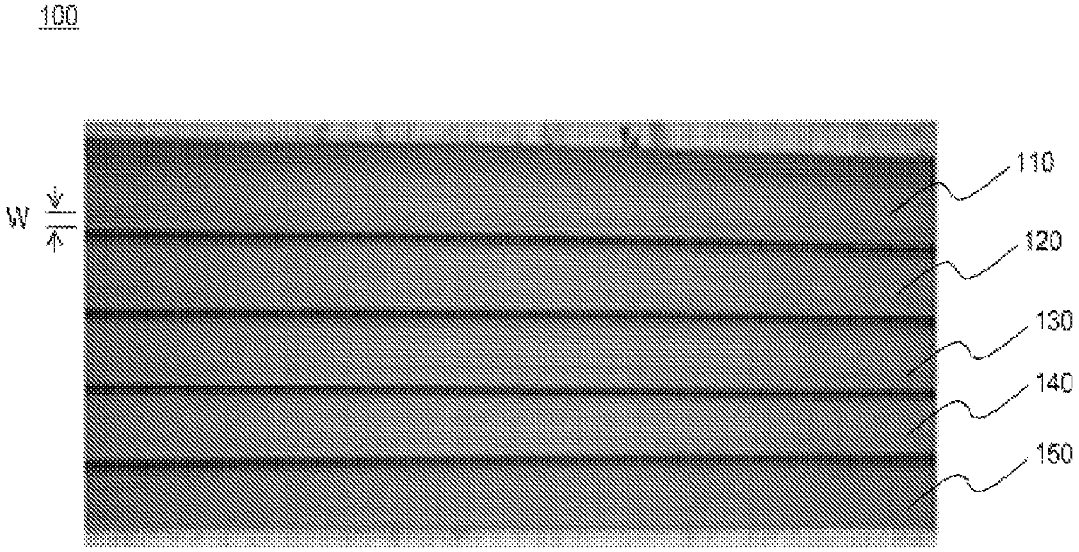
FIG. 3 is a photograph of plan view illustrating a tacker constructed siding in accordance with an embodiment of the present invention.

FIG. 3 is a photograph of plan view illustrating a tacker constructed siding in accordance with an embodiment of the present invention.

Referring to FIG. 3, the siding 100 is manufactured by fixing a predetermined portion in such a manner that a plurality of panels 110, 120, 130, 140, 150 are partially overlapped on another panel.

A lower part of the first part 110 covers the upper part of the second panel 120 with a predetermined width W, and a lower part of the second part 120 covers the upper part of the third panel 130 with the same width W, which is the same for the rest panels 130, 140, 150.

The upper parts of the respective panels 110, 120, 130, 140, 150 are fastened using tacker (not shown).

Hereinafter, practical and presently preferred embodiments of the present invention will be described in more detail with reference to accompanying drawings, but it will be appreciated that those skilled in the art, on consideration of this disclosure, may make modifications and improvements within the spirit and scope of the present invention.

Example 1

Figure 1:
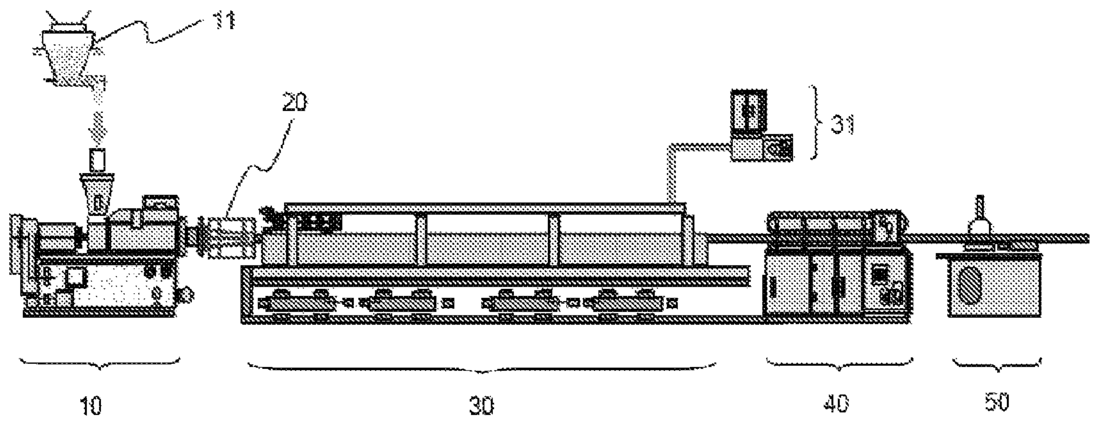
FIG. 1 is a schematic diagram showing a conventional extrusion and cooling system.
Figure 2:
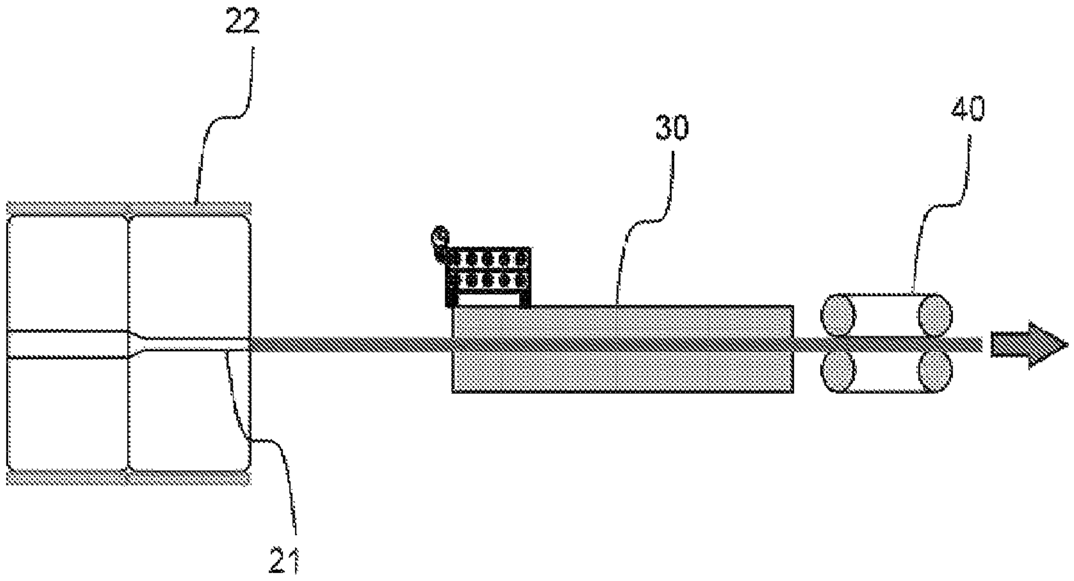
FIG. 2 is a sectional diagram showing an extrusion die and a vacuum cooling device of the extrusion and cooling system in FIG. 1.

In an extrusion system of FIG. 1, to an extruder 10, 34 wt % of polyethylene, 53 wt % of coniferous wooden flour, 10 wt % of talc and the rest amount of other additives were put, followed by melt extrusion and stretch, thereby manufacturing a plurality of tacker construction panels, each having a thickness of 6 mm and a length of 3 m.

The panel showed a contractility of about 0.2% along a longitudinal direction after lapse of 24 hours at a temperature of 60° C. and a humidity of 90% RH.

Example 2

A plurality of tacker construction panels were manufactured by the same manner of Example 1 except that the stretch condition of extrudate was changed, and panel showed a contractility of 0.8% along a longitudinal direction under the same condition.

Example 3

A plurality of tacker construction panels were manufactured by the same manner of Example 1 except that the stretch condition of extrudate was changed, and panel showed a contractility of 1% along a longitudinal direction under the same condition.

Comparative Example 1

A plurality of tacker construction panels were manufactured by the same manner of Example 0.3 except that the stretch condition of extrudate was changed, and panel showed an expansion ratio of 0.3% along a longitudinal direction under the same condition.

Experimental Example 1

Thermo-hygrostat tests were performed on panels manufactured by cutting extrudates of Example 1 and Comparative Example 1, and the results are shown in Table 1 below.

The thermo-hygrostat tests were performed in such a manner that a panel of which length is previously measured remains for 24 hours at a temperature of 60° C. and a humidity of 90% RH and then the length changed is measure to calculate a length variation.

TABLE 1

| | Contractility/ expansibility | Method of measurement | Thermo-hygrostat dimensional variation (%) |
|---|---|---|---|
| Example 1 | 0.2% (contractility) | After treatment for 24 hours at 60° C. and 90% RH, a dimensional variation in a longitudinal direction was measured. | −0.179 |
| Example 2 | 0.8% (contractility) | | −0.754 |
| Example 3 | 1% (contractility) | | −0.928 |
| Comparative Example 1 | 0.3% (expansibility) | | +0.314 |

Also, the tacker construction panels manufactured in Example 2 and Comparative Example 1 were tacker constructed and then exposed at a temperature of 60° C. and a humidity of 90% RH, respectively.

Figure 4:
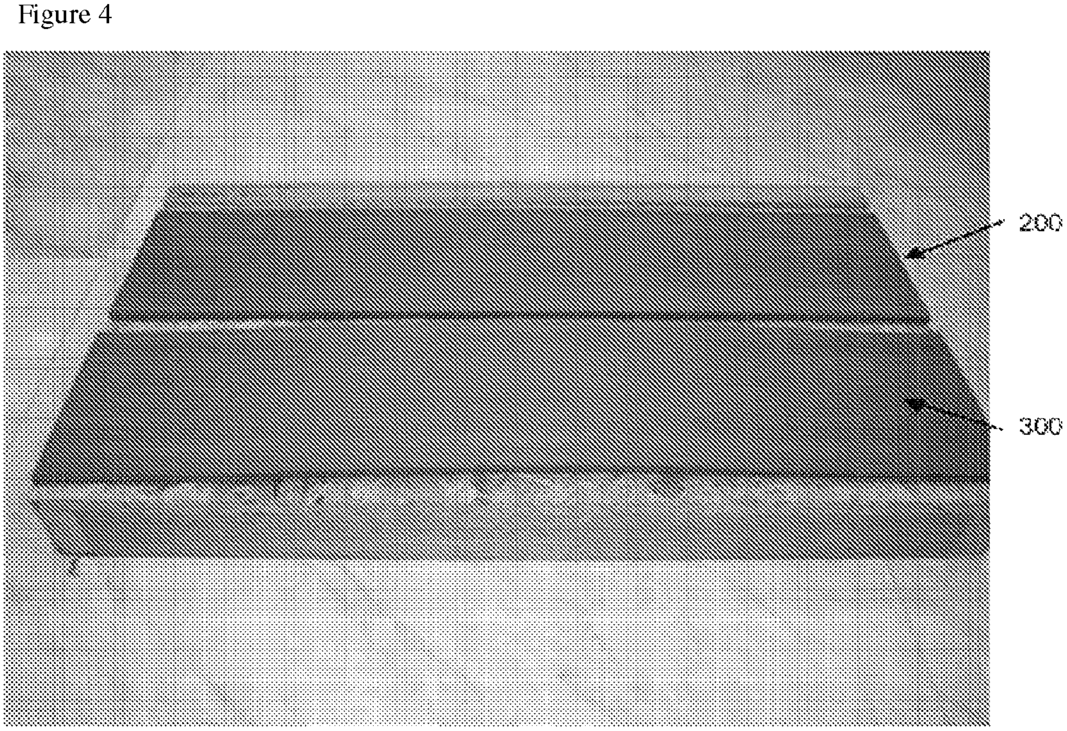
FIG. 4 is a photograph of plan view illustrating a panel having a contractility and a photograph of plan view illustrating a panel having no contractility.

FIG. 4 is photographs showing a tacker construction panel 200 in accordance with Example 2 and a tacker construction panel 300 in accordance with Comparative Example 1.

As can be seen in FIG. 4, the tacker construction panel 200 of Example 1 was not subjected to warpage, but the tacker construction panel 300 of Comparative Example 1 was subjected to warpage by expansion in the middle of the panel fixed by tacker construction.

Experimental Example 2

Sidings were manufactured into the shape shown in FIG. 3 using the tacker construction panels of Example 2 and Comparative Example 1, respectively.

In other words, the tacker construction panel was cut into a size of 6 mm in thickness and 210 mm in width and the upper part of the panel was tacker constructed with a concrete tacker with a length of 30 mm, thereby constructing the siding.

Heights of warpage were measured on the sidings manufactured by the above manner, and the results are shown in Table 2 below.

The tests were performed in such a manner that after lapse of 2 days and 150 days, whether the warpage occurred is confirmed and a magnitude of the warpage is measured.

TABLE 2

| | Height of warpage (mm) | |
|---|---|---|
| | After lapse of 2 days | After lapse of 150 days |
| Example 2 | 2 | 2 |
| Comparative Example 1 | 7 | 16 |

As shown in Table 2, in the siding using the tacker construction panel in accordance with Example 2 of the present invention, the warpage by expansion was 2 mm, which is relatively less, regardless of the elapsed time.

On the contrary, in the siding using the tacker construction panel in accordance with Comparative Example 1, it was found that the warpage was 7 mm after lapse of 2 days and 16 mm after lapse of 150 days.

Therefore, it can be appreciated that magnitude of the warpage is increased with time in the tacker construction panel in accordance with Comparative Example 1.

Figure 5A:
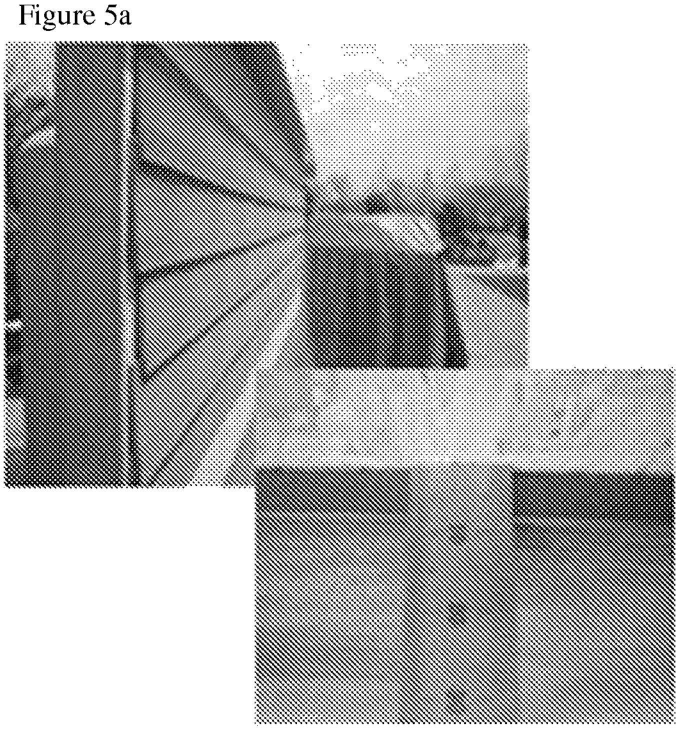
FIG. 5*a* is a photograph of side view showing the tacker construction panel of Example 2 photographed after lapse of 2 days and an enlarged photograph of the warpage portion.
Figure 5B:
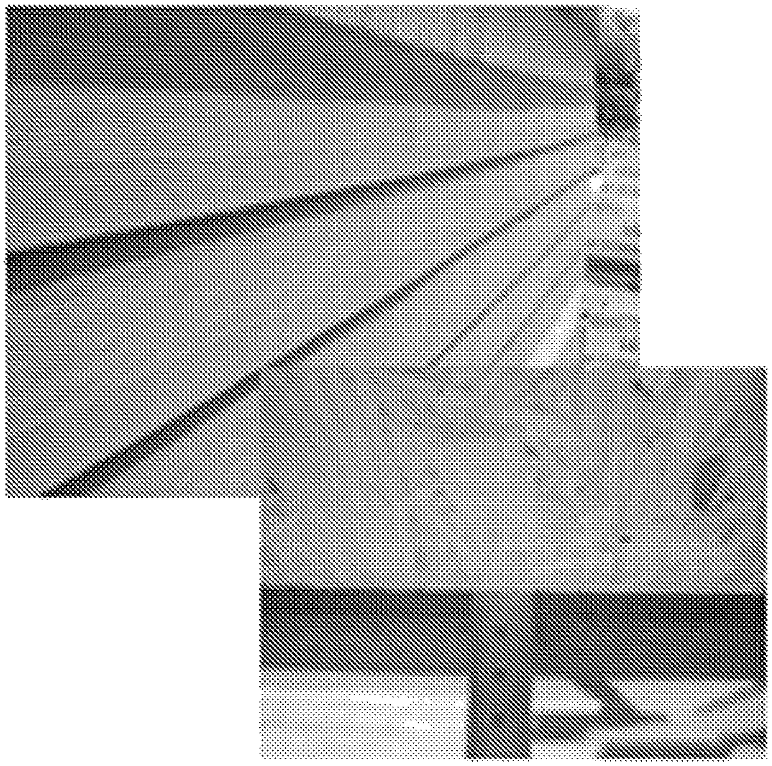
FIG. 5*b* is a photograph of side view showing the tacker construction panel of Example 2 photographed after lapse of 150 days and an enlarged photograph of the warpage portion.

FIG. 5*a* shows a photograph of side view of the siding having the contractility photographed after lapse of 2 days and an enlarged photograph of the warpage portion, and FIG. 5*b* shows a photograph of side view of the siding having the contractility photographed after lapse of 150 days and an enlarged photograph of the warpage portion.

As shown in FIGS. 5*a* and 5*b*, it can be appreciated that in the siding having the contractility, the height of warpage by the expansion is fixed to 2 mm regardless of the elapsed time.

Figure 6A:
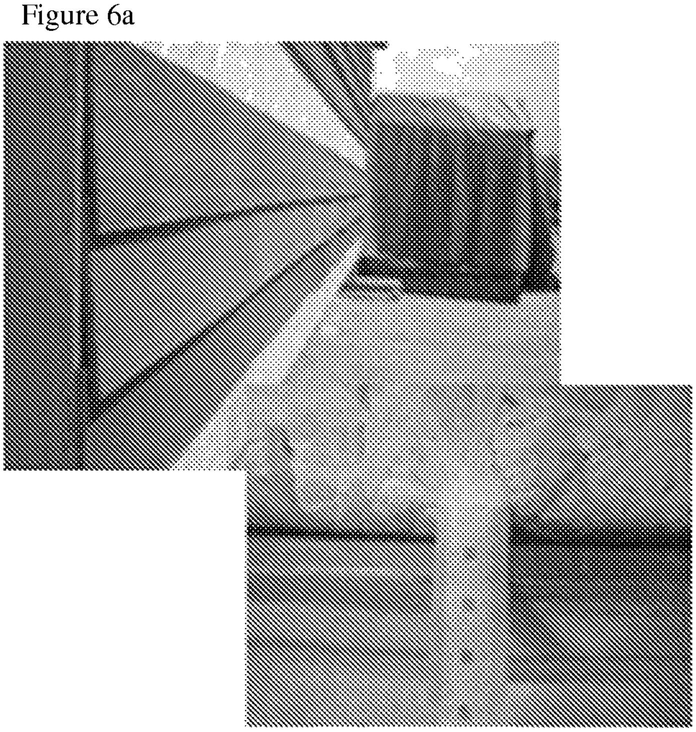
FIG. 6*a* is a photograph of side view showing the tacker construction panel of Comparative Example 1 photographed after lapse of 2 days and an enlarged photograph of the warpage portion.
Figure 6B:
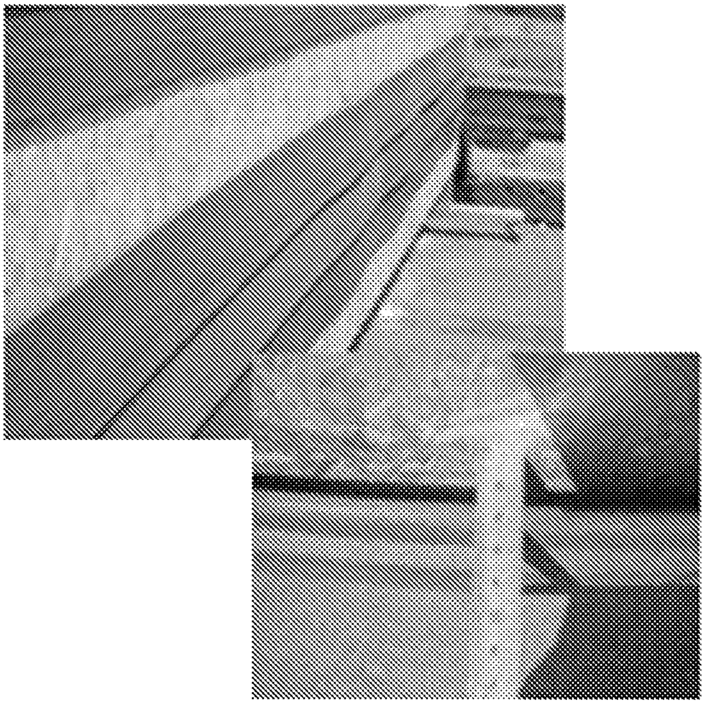
FIG. 6*b* is a photograph of side view showing the tacker construction panel of Comparative Example 1 photographed after lapse of 150 days and an enlarged photograph of the warpage portion.

FIG. 6*a* shows a photograph of side view of the siding having no contractility photographed after lapse of 2 days and an enlarged photograph of the warpage portion, and FIG. 6*b* shows a photograph of side view of the siding having no contractility photographed after lapse of 150 days and an enlarged photograph of the warpage portion.

As shown in FIGS. 6*a* and 6*b*, it was clearly appeared that the siding having no contractility is subjected to warpage with time by expansion.

Figure 7:
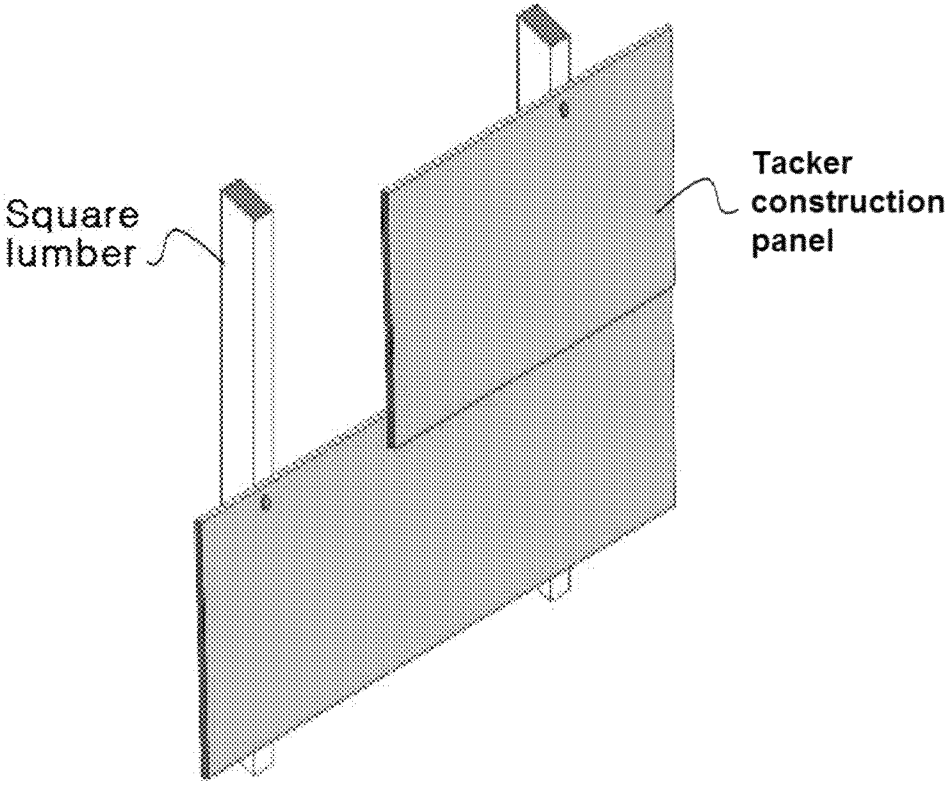
FIG. 7 is a partial diagram illustrating an example of a tacker construction using the tacker construction panel in accordance with the present invention.

In summary, since the tacker construction panel in accordance with the present invention shows a contractility in a longitudinal direction of the panel, it is possible to easily construct the panel on a square lumber with a tacker nail as shown in FIG. 7.

Figure 8:
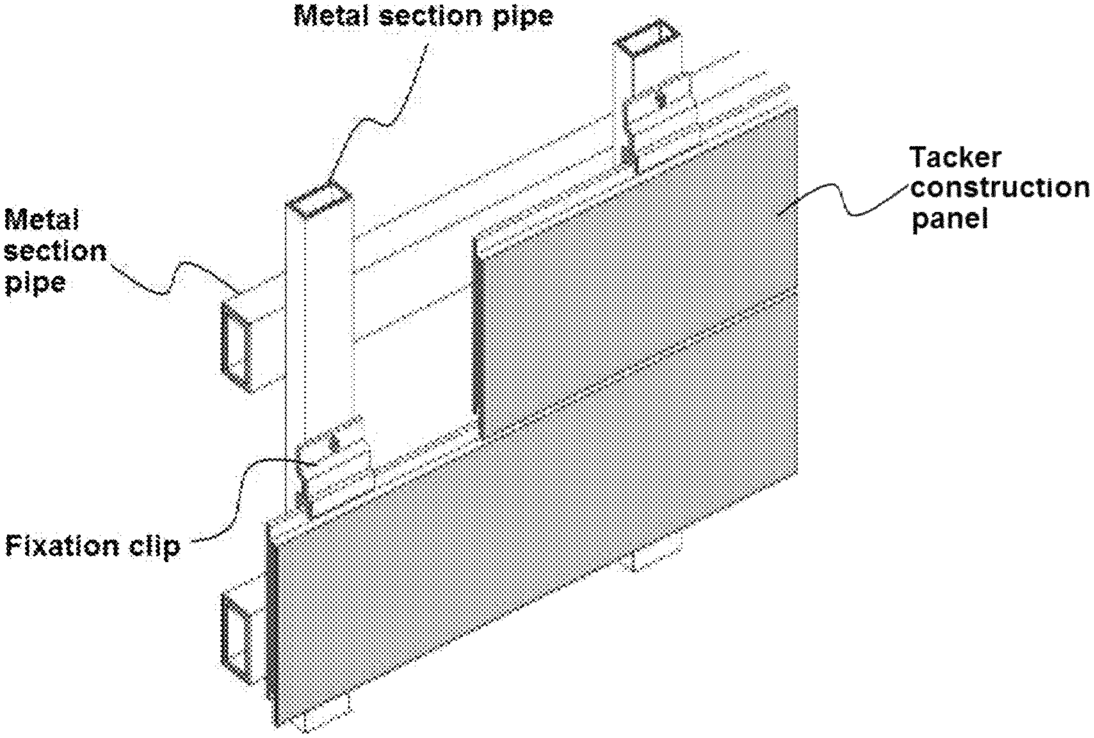
FIG. 8 is a partial diagram illustrating an example of a tacker construction using a conventional tacker construction panel.

On the contrary, since the conventional tacker construction panel shows an expansibility in a longitudinal direction of the panel, the panel should be constructed by a welding using a separate member such as a fixation clip in the state that a plurality of metal section pipes thereunder is installed as shown in FIG. 8.

As described above, the tacker construction panel made of WPC in accordance with the present invention keeps, since it is formed of a panel showing a contractility under a specific condition, a generally stable shape of the panel even when the panel is expanded by an external cause, and as the result, if when used as an exterior material, it can form a structure stable for a long time at a desired level even when tacker constructed.

While the present invention has been described with respect to the specific embodiments, it will be apparent to those skilled in the art that various changes and modifications may be made without departing from the spirit and scope of the invention as defined in the following claims.

The invention claimed is:

1. A tacker construction panel, made of wood plastic composite, wherein the panel includes 50 to 85 wt % of wooden flour, has a thickness of 2 to 10 mm and shows a contractility of 0.1 to 3% along a longitudinal direction after lapse of 24 hours at a temperature of 60° C. and a humidity of 90% RH, wherein the contractility is set inverse proportional to the thickness of the panel within a range of the thickness of the panel.

2. The tacker construction panel as set forth in claim 1, wherein the thickness of the panel is 3 to 8 mm.

3. The tacker construction panel as set forth in claim 1, wherein the panel is manufactured by an extrusion process, and the contractility is given by stretch during the extrusion process.

4. The tacker construction panel as set forth in claim 1, wherein the contractility of the panel is 0.2 to 1%.

5. The tacker construction panel as set forth in claim 1, wherein the panel is formed in a solid structure having a density of 1.0 g/cm$^3$ or less.

6. The tacker construction panel as set forth in claim 1, wherein the panel is formed in a micro cellular foamed structure.

7. A wood plastic composite panel comprising 50 to 85 wt % of wooden flour, wherein the panel has a thickness of 2 to 10 mm and shows a contractility of 0.2 to 1% along a longitudinal direction after lapse of 24 hours at a temperature of 60° C. and a humidity of 90% RH, wherein the contractility is set inverse proportional to the thickness of the panel within a range of the thickness of the panel.

8. The wood plastic composite panel as set forth in claim 7, wherein the panel is manufactured by an extrusion process, and the contractility is given by stretch during the extrusion process.

9. The wood plastic composite panel as set forth in claim 8, wherein the thickness of the panel is 3 to 8 mm.

* * * * *